(12) United States Patent
Fahldieck

(10) Patent No.: US 8,894,114 B2
(45) Date of Patent: Nov. 25, 2014

(54) PET BOTTLE GRIPPING DEVICE

(75) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 13/878,477

(22) PCT Filed: Oct. 19, 2011

(86) PCT No.: PCT/EP2011/005253
§ 371 (c)(1),
(2), (4) Date: Apr. 9, 2013

(87) PCT Pub. No.: WO2012/069109
PCT Pub. Date: May 31, 2012

(65) Prior Publication Data
US 2013/0193702 A1 Aug. 1, 2013

(30) Foreign Application Priority Data
Nov. 25, 2010 (DE) .......................... 10 2010 052 348

(51) Int. Cl.
*B25J 15/06* (2006.01)
*B65G 47/86* (2006.01)
*B67C 3/24* (2006.01)

(52) U.S. Cl.
CPC .............. *B65G 47/847* (2013.01); *B67C 3/242* (2013.01)
USPC ........ 294/90; 294/198; 198/803.9; 198/407.1

(58) Field of Classification Search
CPC .......... A47J 45/10; E21B 19/06; E21B 31/18; B66C 1/48; B65G 7/12; B65G 47/847; Y10S 211/01; F16M 13/02; B25H 3/04; F16B 2001/0035; H01F 7/0252; B65H 2220/01; B65H 2220/02; B65H 2301/44712; B65H 29/003
USPC .............. 294/28, 30, 31.1, 104, 116, 90, 198, 294/194, 197, 65.5, 199; 198/867.07, 198/803.3, 803.9, 470.1; 248/309.4
See application file for complete search history.

(56) References Cited

U.S. PATENT DOCUMENTS

| | | | | |
|---|---|---|---|---|
| 4,172,514 A | * | 10/1979 | Shantz et al. .............. | 198/470.1 |
| 5,743,377 A | * | 4/1998 | Kronseder ................. | 198/803.9 |
| 5,893,700 A | * | 4/1999 | Kronseder ................. | 414/744.2 |
| 6,283,701 B1 | * | 9/2001 | Sundar et al. .............. | 414/744.5 |
| 2003/0197391 A1 | * | 10/2003 | Graffin .......................... | 294/104 |
| 2008/0272609 A1 | * | 11/2008 | Knieling et al. ................. | 294/90 |

FOREIGN PATENT DOCUMENTS

| | | |
|---|---|---|
| DE | 9111159 | 10/1991 |
| DE | 4424077 | 1/1996 |
| DE | 19536692 | 8/1996 |

(Continued)

*Primary Examiner* — Stephen Vu
(74) *Attorney, Agent, or Firm* — Occhiuti & Rohlicek LLP

(57) ABSTRACT

An apparatus for gripping and retaining PET bottles in a filling system includes a passive clamping system having pivotable gripping arms that pivot around corresponding pivot axles and that are acted upon by either a spring or permanent magnets. The first pivotable gripping arm has a first extension on an other side of the first pivot axle and the second pivotable gripping arm has a second extension on an other side of the second pivot axle. The extensions have receptacles for guiding a compression spring and for applying a bending force to the compression spring or to sub-segments thereof. These receptacles can be rod-shaped or rail-shaped.

12 Claims, 3 Drawing Sheets

(56) References Cited

FOREIGN PATENT DOCUMENTS

| | | |
|---|---|---|
| DE | 29712066 | 10/1997 |
| DE | 29713510 | 8/1998 |
| DE | 202005002924 | 3/2006 |
| DE | 102008019766 | 4/2009 |
| DE | 102008032645 | 1/2010 |
| DE | 102008055618 | 7/2010 |
| EP | 2159172 | 3/2010 |
| EP | 2202183 | 6/2010 |
| FR | 2895384 | 6/2007 |
| JP | 2190229 | 7/1990 |
| WO | 2003078285 | 9/2003 |

* cited by examiner

PET BOTTLE GRIPPING DEVICE

CROSS REFERENCE TO RELATED APPLICATION

This application is the national phase under 35 USC 371 of international application no. PCT/EP2011/005253, filed Oct. 19, 2011, which claims the benefit of the priority date of German application no. 10 2010 052 348.8, filed Nov. 25, 2010. The contents of the aforementioned applications are incorporated herein in their entirety.

FIELD OF DISCLOSURE

The invention relates to a device for gripping and retaining PET (polyethylene terephthalate) bottles in filling systems for the purpose of transporting between the rinser and filler.

BACKGROUND

Such retaining devices are known in a wide range of different variants and examples of embodiments. For instance, DE 10 2008 019 766 B1 discloses such a device, wherein, in the vicinity of the gripping opening, the gripping arms are held in the closed position by means of a tension spring.

A retaining device of the generic type is disclosed in the utility model DE 297 13 510 U1, in which, in one variant embodiment, parts of the gripping arms which extend beyond the axis of rotation are acted upon by a compression spring in order to apply the closing force.

The known solutions already exhibit some advantages, and therefore the object of the invention is to further develop such a device so that not only are the closing forces optimally applied but also the gripping arms are subjected to a force for centring purposes.

With a device of the type described above, this object is achieved according to the invention in that the gripping arms have extensions on the other side of the respective pivot axle, said extensions having rod- or rail-shaped receptacles, in particular cylindrical receptacles, for guiding at least one compression spring and for applying a bending force to the compression spring or to sub-segments of the compression spring.

By passing a plurality of turns of a compression spring through the receptacles according to the invention, an additional adjusting pressure is exerted on the respective gripping arm when the central axes of the cylindrical receptacles assume a certain angular offset from each other, since these receptacles which serve as spring pins can also transmit bending moments and thus are able to bend the compression spring axis and/or to absorb the forces thereof by springing back.

SUMMARY

Embodiments of the invention will become apparent from the dependent claims. For instance, one variant of the invention consists in that in each case at least one permanent magnet is arranged in the receptacles of the compression spring. The respective magnets may serve to support the compression spring or to reduce the slope of the overall force characteristic formed from the force component of the compression spring and the force component of the mutually attracting magnets. In the latter case, they can also contribute at least partially to centring.

One advantageous embodiment consists in supplementing these magnets, the task of which is also performed by the compression spring, by magnets with an attracting effect arranged on the radially outer side of the centre of rotation. Due to the combination of repelling magnets on one side and attracting magnets on the other side, a large gripping or opening range is possible.

Substantially two states are obtained as a result.

The first state is described in that the clamp is almost closed, e.g. in the case of small bottle mouths, and the magnets act mainly close to the mouth. These magnets located opposite one another have an attracting effect and thus keep the clamp closed and at the same time also have a centring effect since they also counteract any "displacement" of the two clamps relative to one another.

The second state can be described as follows: The clamp is opened very wide, e.g. in the case of large bottle mouths, and the magnets act mainly radially inwardly on the opposite side of the centre of rotation.

By providing the permanent magnets with poles oriented in the same direction in relation to the side facing towards the respective opposite gripping arm, a force is applied in the closing direction of the gripping arms, wherein the orientation may be such that the individual permanent magnet on one gripping arm penetrates between the two magnets on the other gripping arm and thus at the same time a centring force is exerted by virtue of the identical polarity.

One embodiment of the invention consists in that the respective guide for the compression spring on each gripping arm measures at least one-third of the compression spring length, wherein in particular it may also be provided that the receptacles radially inwardly fill or radially outwardly surround the compression spring along a partial length with a form fit.

It may advantageously be provided that an extension of one gripping arm has two permanent magnet receptacles positioned at a distance from each other and the associated extension of the other gripping arm has one permanent magnet receptacle arranged centrally therebetween, wherein the orientation of the permanent magnets is positioned in the receptacles so as to exert a mutually repelling force.

In a further advantageous embodiment, it is also provided that the gripping arms, in the front region located on the far side of the respective pivot axle, are each equipped with at least one receptacle for a permanent magnet in an opposing position, wherein the permanent magnets are arranged with opposing poles so as to exert a closing force.

Due to this self-centring, the design of the bottle clamp in the bottle retaining region can be simplified, since it no longer has to perform the centring task.

One configuration of the bottle clamp in the bottle retaining region is to make the overhang beyond the bottle centre as small as possible, so that the "rack and pinion" effect is minimised. The aforementioned effect arises when picking up and dropping off a bottle and manifests itself in a lateral displacement of the clamp as a whole or of the gripping arms thereof. If the rack and pinion effect is small, this in turn leads to a quiet running of the system because the container handovers take place "gently". This embodiment proves to be highly advantageous in the case of small diameters of transport starwheels and in the case of rapidly running systems.

One suitable design of the bottle clamp in the bottle retaining region leads to a large range of the possible mouth diameter in the range from 23 mm-46 mm.

Since the compression spring and/or the magnets are positioned relatively far from the bottles to be gripped in each case, bottles of different size can be handled using the same bottle clamp, in particular including large bottles with large mouth diameters.

Since the compression spring and/or the magnets are positioned relatively far from the bottles to be gripped in each case, even large bottle diameters and bottles with greatly pronounced shoulders can be handled.

Moreover, the compression spring and/or the magnets are located further away from the bottles so that only parts which are easy to clean from the hygiene point of view, for example the substantially smooth regions of the gripping arms, are located close to the mouth.

Due to the combination of the compression spring with attracting permanent magnets, an almost horizontal overall spring characteristic can be achieved, i.e. uniform retaining forces regardless of the mouth diameter while supporting the centring effect.

Due to the centring, a stop can be entirely omitted, which has the advantage that the bottle clamps move away to the side but remain in contact with the bottle neck, as a result of which there is a much lower risk of dropping a bottle.

Another advantage from the hygiene point of view lies in the fact that, due to the radially inwardly arranged compression spring and/or the magnets, the bottle or bottle mouth is relatively remote and moreover any liquid possibly adhering to the bottle is accelerated away from the compression spring during normal operation. Only parts which are easy to clean are arranged close to the bottle mouth, which makes the overall structure more hygienic.

BRIEF DESCRIPTION OF THE FIGURES

Further features, details and advantages of the invention will become apparent from the following description and with reference to the drawing, in which.

DETAILED DESCRIPTION

Figures 3, 3A:
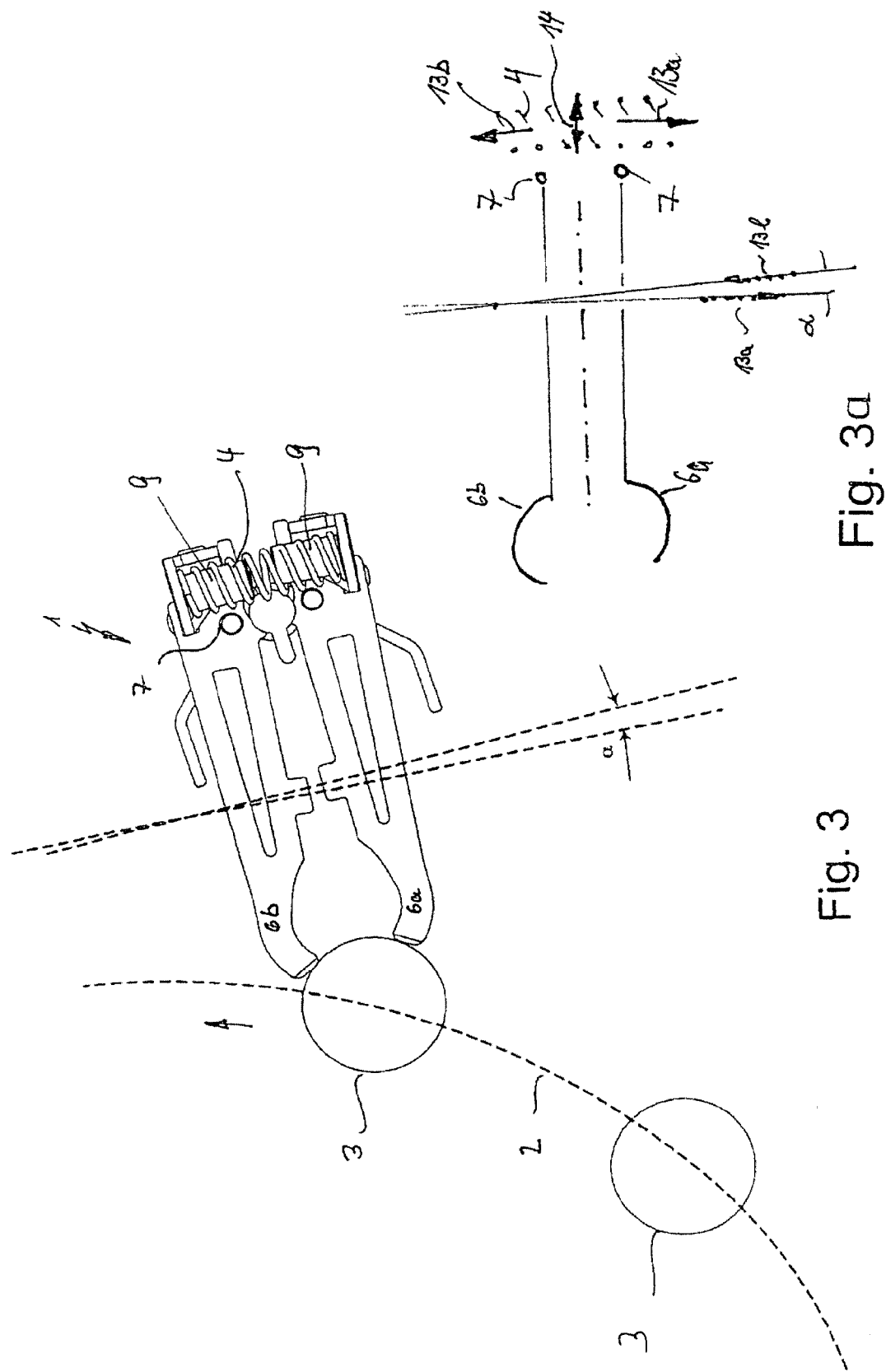
FIG. 3 shows the device according to the invention at the point of first contact with a bottle neck.
FIG. 3a shows a simplified diagram of the force vectors for closing and centring the gripping arms.

The device denoted generally by 1 serves for gripping and retaining bottles or containers in filling systems or the like, in particular PET bottles, wherein the system parts that are known in principle are not shown in any great detail in the figures and in FIG. 3 are indicated by a circular arc 2 in dashed line. In FIG. 3, the bottle necks to be gripped are also shown and are denoted by 3.

The device 1 is equipped with a so-called passive clamp system, in particular is equipped with pivotable gripping arms 6, hereinafter denoted 6a and 6b for distinction purposes, which are acted upon by a compression spring 4 and/or permanent magnets denoted generally by 5 in FIG. 2.

Figure 1:
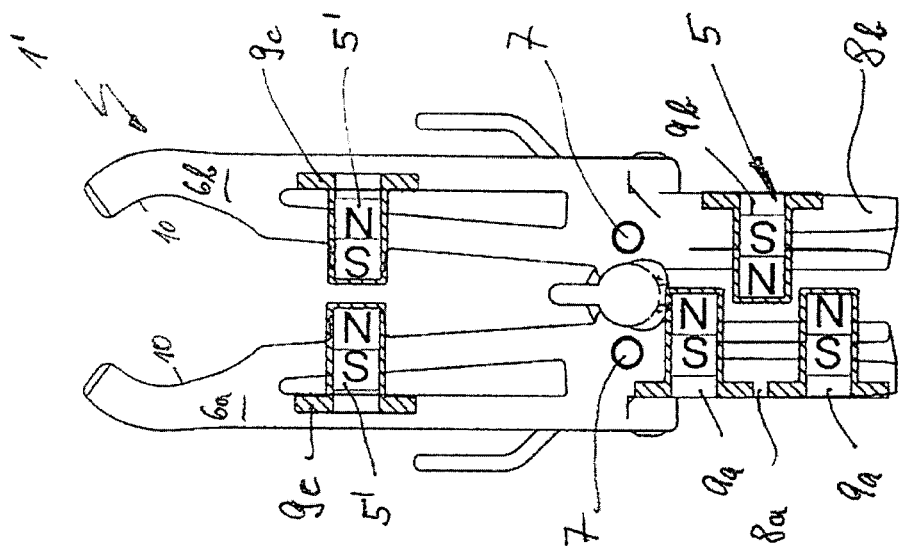
FIG. 1 shows a plan view of a device according to the invention in a first example of embodiment.

As known, these gripping arms 6 are rotatably mounted on pivot axles 7 and beyond the pivot axles 7 are equipped with extensions 8, on which cylindrical receptacles 9 are provided, which receptacles in the example of FIG. 1 engage in the interior of the compression spring 4 and guide the compression spring 4 over one-third in the illustrated example.

One variant embodiment (not shown) consists in that arranged in the cylindrical receptacles 9 are permanent magnets which in particular exert an attracting magnetic force on each other, i.e. act counter to the compression spring 4. As a result, an advantageous flat overall characteristic of the forces can be achieved. In this variant embodiment, no permanent magnets are arranged in the region of the gripping arms 6.

Figure 2:
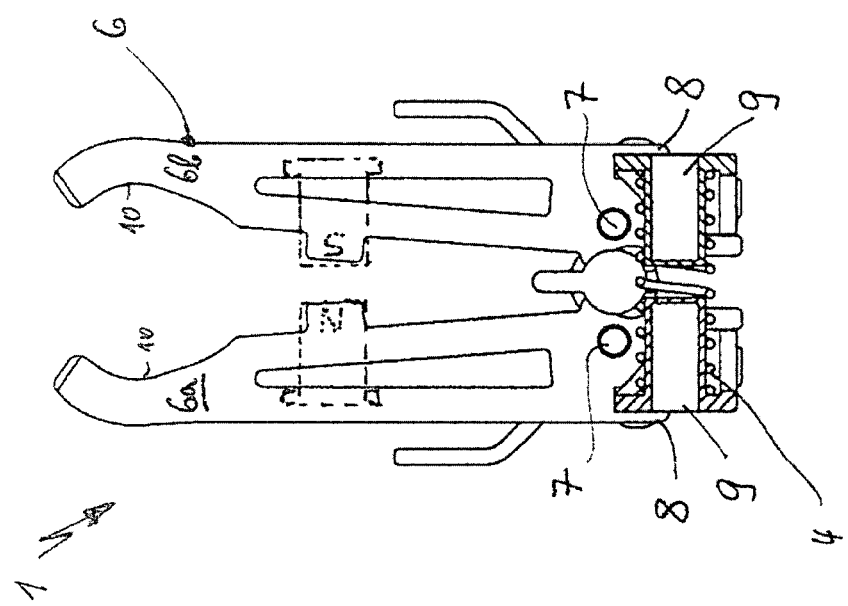
FIG. 2 shows, in a similar diagram, the plan view of a variant of the device according to the invention.

A modified example of embodiment is shown in FIG. 2. Here, the device, generally denoted by 1', is likewise equipped with two gripping arms 6a and 6b which are able to pivot about pivot axles 7, wherein the extensions 8 (denoted 8a and 8b in FIG. 2) have cylindrical receptacles 9a and 9b which accommodate permanent magnets 5. In the illustrated example of FIG. 2, the gripping arm 6a is equipped with two cylindrical receptacles 9a, whereas the extension 8b has just one cylindrical receptacle 9b positioned centrally relative to the other two.

As shown in FIG. 2, these receptacles are fitted with permanent magnets in such a way that the same poles engage in the space created between the extensions 8a and 8b, and due to the fact that the poles are the same the magnets repel each other so that a closing force is generated here as in the case of the compression spring 4.

FIG. 2 also shows that the gripping arms 6a and 6b may be equipped with further cylindrical receptacles 9c in the region thereof facing towards the front gripping arcs 10, in which receptacles permanent magnets 5' are positioned in an opposing pole sequence so that they exert a closing force on the gripping arms 6a and 6b.

FIG. 3 shows the region where a bottle neck 3 runs into a device 1, wherein the gripping arm 6a arranged in front in the run-in direction assumes a slightly asymmetrical position relative to the second gripping arm 6b, so that a slight angular offset, denoted "α" in FIG. 3, is obtained.

Due to the sufficiently long guidance of the compression spring 4 by the cylindrical receptacles 9, which can also be referred to as spring pins, the middle region of the compression spring can act on the gripping arms 6a and 6b in such a way that they again assume a centred position after gripping the bottle neck 3.

FIG. 3a shows, in greatly simplified form, the force vectors in the plane of the gripping arms which serve firstly for closing the gripping arms 6a and 6b but in particular also for centring the gripping arms which are shown in an eccentric position and which can pivot about the pivot axles 7. The vector obtained from the closing force of the compression spring 4, directed in the closing direction of the pivoting arm 6a, is denoted by 13a in FIG. 3a. The vector acting in the closing direction of the gripping arm 6b is denoted by reference 13b. The corresponding lines of action are shown eccentrically, the misaligned component thereof being denoted "α". The vectors of the closing force reproduced thereon are shown in dotted line and likewise bear the references 13a and 13b. The vector of the bending force of the compression spring 4, which also brings about the centring effect, is denoted by 14 as a double-headed arrow in FIG. 3a. Since, due to the cylindrical receptacles 9a and 9b, this force can act directly on the respective gripping arm, the latter strive to centre themselves again; here, the vector of the bending force lies in a theoretical plane which is spanned by the grippers or gripping arms 6a and 6b or is spatially positioned in a manner slightly offset from and parallel to the latter.

Figure 4:
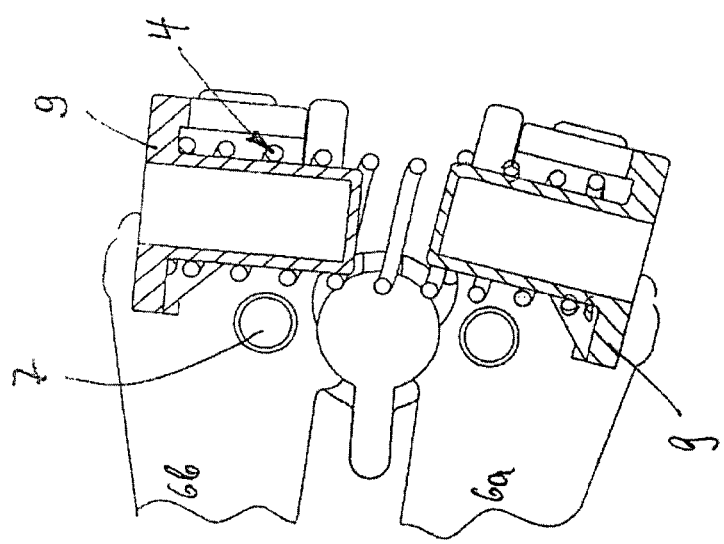
FIG. 4 shows an enlarged view of the asymmetrically deflected gripping arms.

The eccentric position of the cylindrical receptacles 9 on the respective gripping arm 6a and 6b is shown on an enlarged scale in FIG. 4.

Figure 5:
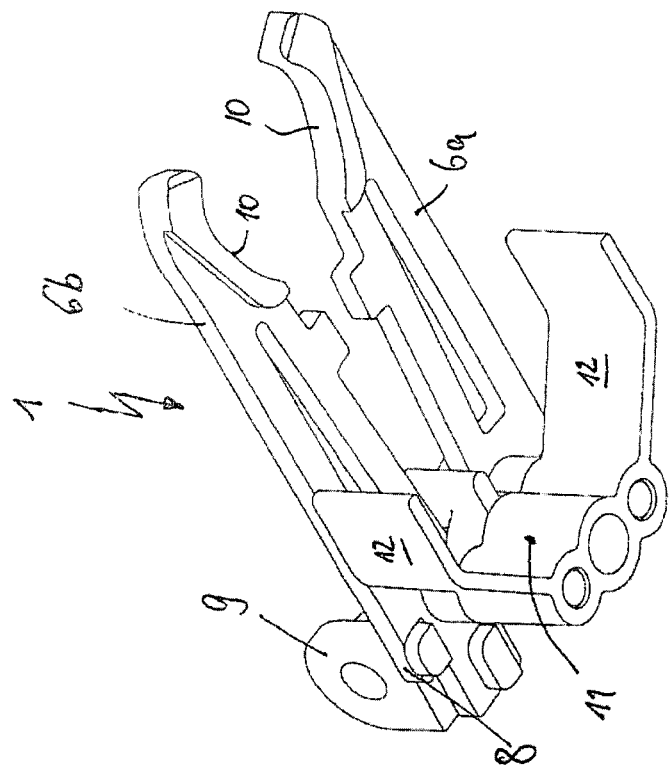
FIG. 5 shows a three-dimensional view of a device according to the invention with a mounting element.

Finally, FIG. 5 shows a three-dimensional view of the device 1 which is positioned via a plug-in connection in the other machine elements, wherein here just one support body 11 with integral, deformable fixing elements in lobe form is shown.

Of course, the described examples of embodiments can be modified in many ways without departing from the basic concept. For instance, combinations between the permanent magnets, which generate the closing force and which are assigned to the gripping arcs 10, with a helical compression spring, as shown in FIG. 1, may be provided, or else a corresponding combination of spring and magnets on the extensions 8 of the gripping arms 6.

LIST OF REFERENCES 1 device
2 circular arc
3 bottle necks
4 compression spring
5 permanent magnets
6, 6a, 6b gripping arms
7 pivot axle
8, 8a, 8b extensions
9, 9a, 9b cylindrical receptacles
10 gripping arcs
11 support arc
12 fixing elements
13a, 13b vectors
14 double-headed arrow

The invention claimed is:

1. An apparatus for gripping and retaining PET bottles in a filling system, said apparatus comprising a passive clamping system, said passive clamping system comprising a first pivotable gripping arm that pivots about a first pivot axle and a second pivotable gripping arm that pivots about a second axle, said first and second pivotable gripping arms being acted on by one of a spring and permanent magnets, wherein said first pivotable gripping arm comprises a first extension on an other side of said first pivot axle and said second pivotable gripping arm comprises a second extension on an other side of said second pivot axle, said first and second extensions comprising receptacles for guiding at least one compression spring and for applying a bending force to at least one of said at least one compression spring and to sub-segments of said at least one compression spring, said receptacles being selected from the group consisting of rod-shaped receptacles and rail-shaped receptacles, a first permanent magnet arranged in said receptacles for guiding said at least one compression spring, and a second permanent magnet arranged in said receptacles for guiding said at least one compression spring, and wherein said second permanent magnet and said first permanent magnet being oriented with opposing poles so as to attract each other.

2. The apparatus of claim 1, wherein said compression spring has a compression-spring length, and wherein each of said receptacles has a length that is at least one-third of said compression-spring length and is configured to enable application of said bending force.

3. The apparatus of claim 1, wherein said receptacles radially inwardly fill said at least one compression spring along a partial length thereof with a form fit.

4. The apparatus of claim 1, wherein said receptacles radially outwardly surround said at least one compression spring along a partial length thereof with a form fit.

5. The apparatus of claim 1, wherein said first extension comprises two permanent magnet receptacles positioned at a distance from each other, wherein said second extension comprises one permanent magnet receptacle arranged centrally therebetween, and wherein said permanent magnets are oriented in said receptacles so as to exert a mutually repelling force.

6. The apparatus of claim 1, wherein said first and second pivotable gripping arms, in a front region located on a far side of respective pivot axles thereof, each comprise at least one receptacle for a permanent magnet in an opposing position, wherein said permanent magnets are arranged with opposing poles so as to exert a closing force.

7. An apparatus for gripping and retaining PET bottles in a filling system, said apparatus comprising a passive clamping system, said passive clamping system comprising a first pivotable gripping arm that pivots about a first pivot axle and a second pivotable gripping arm that pivots about a second axle, said first and second pivotable gripping arms being acted on by one of a spring and permanent magnets, wherein said first pivotable gripping arm comprises a first extension on an other side of said first pivot axle and said second pivotable gripping arm comprises a second extension on an other side of said second pivot axle, said first and second extensions comprising receptacles for guiding at least one compression spring and for applying a bending force to at least one of said at least one compression spring and to sub-segments of said at least one compression spring, said receptacles being selected from the group consisting of rod-shaped receptacles and rail-shaped receptacles, wherein said receptacles radially inwardly fill said at least one compression spring along a partial length thereof with a form fit.

8. The apparatus of claim 7, further comprising a first permanent magnet arranged in said receptacles for guiding said at least one compression spring.

9. The apparatus of claim 7, wherein said compression spring has a compression-spring length, and wherein each of said receptacles has a length that is at least one-third of said compression-spring length and is configured to enable application of said bending force.

10. The apparatus of claim 7, wherein said receptacles radially outwardly surround said at least one compression spring along a partial length thereof with a form fit.

11. The apparatus of claim 7, wherein said first extension comprises two permanent magnet receptacles positioned at a distance from each other, wherein said second extension comprises one permanent magnet receptacle arranged centrally therebetween, and wherein said permanent magnets are oriented in said receptacles so as to exert a mutually repelling force.

12. The apparatus of claim 7, wherein said first and second pivotable gripping arms, in a front region located on a far side of respective pivot axles thereof, each comprise at least one receptacle for a permanent magnet in an opposing position, wherein said permanent magnets are arranged with opposing poles so as to exert a closing force.

\* \* \* \* \*